US010091721B2

(12) United States Patent
Cui et al.

(10) Patent No.: US 10,091,721 B2
(45) Date of Patent: *Oct. 2, 2018

(54) ACCESS NETWORK DISCOVERY AND SELECTION FUNCTION ENHANCEMENT WITH CELL-TYPE MANAGEMENT OBJECT

(71) Applicant: AT&T Intellectual Property I, L.P., Atlanta, GA (US)

(72) Inventors: Zhi Cui, Sugar Hill, GA (US); Farooq Bari, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,625

(22) Filed: Dec. 14, 2015

(65) Prior Publication Data

US 2016/0100357 A1   Apr. 7, 2016

Related U.S. Application Data

(63) Continuation of application No. 14/064,329, filed on Oct. 28, 2013, now Pat. No. 9,241,305.

(51) Int. Cl.
*H04W 48/18* (2009.01)
*H04W 48/16* (2009.01)
(Continued)

(52) U.S. Cl.
CPC .......... *H04W 48/18* (2013.01); *H04W 28/08* (2013.01); *H04W 48/16* (2013.01);
(Continued)

(58) Field of Classification Search
CPC ..... H04W 28/08; H04W 48/08; H04W 48/16; H04W 48/18; H04W 52/0241;
(Continued)

(56) References Cited

U.S. PATENT DOCUMENTS 5,839,070 A   11/1998   Lupien et al.
5,953,677 A   9/1999    Sato
(Continued)

FOREIGN PATENT DOCUMENTS

AU   2005320356   12/2005
EP   2244503      10/2010
(Continued)

OTHER PUBLICATIONS

U.S. Office Action dated Apr. 14, 2016 in U.S. Appl. No. 13/707,551.
(Continued)

*Primary Examiner* — Tri H Phan
(74) *Attorney, Agent, or Firm* — Hartman & Citrin LLC

(57) ABSTRACT

Concepts and technologies described herein relate to an enhancement to an access network discovery and selection function ("ANDSF") with a cell-type management object ("MO") within an ANDSF MO tree. According to one aspect disclosed herein, a system including an ANDSF can generate a policy for network selection. The policy can include network selection criteria based upon a cell-type. The cell-type may be a small cell cell-type, a macro cell cell-type, or a multi-standard metro cell ("MSMC") cell-type. The network selection criteria can be further based upon WI-FI availability. The system can send the policy to a mobile device. The mobile device can utilize the policy to select a network. In some embodiments, the network selection criteria includes network load information, local device information, user profile information, or some combination thereof.

20 Claims, 9 Drawing Sheets

(51) Int. Cl.
*H04W 28/08* (2009.01)
*H04W 52/02* (2009.01)

(52) U.S. Cl.
CPC ......... *H04W 52/0241* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/23* (2018.01)

(58) Field of Classification Search
CPC ........ Y02B 60/50; Y02D 70/00; Y02D 70/23; Y02D 70/142; Y02D 70/144; Y02D 70/146; Y02D 70/164; Y02D 70/1224; Y02D 70/1226; Y02D 70/1242; Y02D 70/1244; Y02D 70/1246; Y02D 70/1262
See application file for complete search history.

(56) References Cited

U.S. PATENT DOCUMENTS

| | | | |
|---|---|---|---|
| 6,314,308 B1 | 11/2001 | Sheynblat et al. | |
| 6,430,168 B1 | 8/2002 | Djurkovic et al. | |
| 6,628,946 B1 | 9/2003 | Wiberg et al. | |
| 7,082,305 B2 | 7/2006 | Willars et al. | |
| 7,116,970 B2 | 10/2006 | Brusilovsky et al. | |
| 7,146,130 B2 | 12/2006 | Hsu et al. | |
| 7,299,019 B1 | 11/2007 | Austin et al. | |
| 7,400,600 B2 | 7/2008 | Mullany et al. | |
| 7,400,886 B2 | 7/2008 | Sahim et al. | |
| 7,440,755 B2 | 10/2008 | Balachandran | |
| 7,496,060 B2 | 2/2009 | Ramirez et al. | |
| 7,508,781 B2 | 3/2009 | Liu et al. | |
| 7,590,422 B1 | 9/2009 | Chow et al. | |
| 7,653,392 B2 | 1/2010 | Ovadia et al. | |
| 7,680,469 B2 | 3/2010 | Fry | |
| 7,924,787 B2 | 4/2011 | Lee | |
| 7,929,964 B2 | 4/2011 | Arumi et al. | |
| 7,936,708 B2 | 5/2011 | Kesavan et al. | |
| 7,983,713 B2 | 7/2011 | Sasse et al. | |
| 8,045,980 B2 | 10/2011 | Buckley et al. | |
| 8,068,843 B2 | 11/2011 | Yi et al. | |
| 8,073,453 B2 | 12/2011 | Funnell | |
| 8,121,090 B1 | 2/2012 | Dinan et al. | |
| 8,121,607 B2 | 2/2012 | Fang et al. | |
| 8,126,461 B2 | 2/2012 | Sengupta et al. | |
| 8,212,661 B2 | 7/2012 | Shuster | |
| 8,254,982 B2 | 8/2012 | Kuningas | |
| 8,270,975 B2 | 9/2012 | Kim et al. | |
| 8,270,991 B2 | 9/2012 | Zhao | |
| 8,271,025 B2 | 9/2012 | Brisebois et al. | |
| 8,279,831 B2 | 10/2012 | Sengupta et al. | |
| 8,280,377 B2 | 10/2012 | Lee et al. | |
| 8,305,970 B2 | 11/2012 | Park et al. | |
| 8,325,661 B2 | 12/2012 | Montojo et al. | |
| 8,331,228 B2 | 12/2012 | Huber et al. | |
| 8,331,929 B2 | 12/2012 | Brisebois et al. | |
| 8,364,156 B2 | 1/2013 | Chun et al. | |
| 8,385,917 B2 | 2/2013 | Brisebois | |
| 8,391,141 B2 | 3/2013 | Rune et al. | |
| 8,391,238 B2 | 3/2013 | Rune et al. | |
| 8,396,480 B2 | 3/2013 | Prytz et al. | |
| 8,417,823 B2 | 4/2013 | Luna et al. | |
| 8,467,786 B2 | 6/2013 | Salkintzis | |
| 8,488,586 B2 | 7/2013 | Centonza et al. | |
| 8,493,935 B2 | 7/2013 | Zisimopoulous | |
| 8,510,801 B2 | 8/2013 | Majmundar et al. | |
| 8,522,312 B2 | 8/2013 | Huber et al. | |
| 8,649,291 B2 | 2/2014 | Wang et al. | |
| 8,675,583 B2 | 3/2014 | Lee et al. | |
| 8,792,890 B2 * | 7/2014 | Abdel-Samad | H04W 48/16 370/331 |
| 8,885,613 B2 | 11/2014 | Sachs et al. | |
| 9,107,112 B2 * | 8/2015 | Zisimopoulos | H04W 48/16 |
| 9,210,649 B2 * | 12/2015 | Tervonen | H04W 48/08 |
| 9,241,305 B2 * | 1/2016 | Cui | H04W 48/18 |
| 9,319,975 B2 * | 4/2016 | Ferraro Esparza | H04W 48/18 |
| 9,374,773 B2 * | 6/2016 | Cui | H04W 48/18 |
| 9,516,577 B2 * | 12/2016 | Punz | H04W 48/10 |
| 9,591,556 B2 * | 3/2017 | Ventimiglia | H04W 48/16 |
| 9,648,555 B2 * | 5/2017 | Gupta | H04W 48/16 |
| 9,655,007 B2 * | 5/2017 | Reznik | H04L 41/12 |
| 9,661,544 B2 * | 5/2017 | Jamadagni | H04W 36/22 |
| 9,736,762 B2 * | 8/2017 | Sirotkin | H04W 48/14 |
| 2002/0123365 A1 | 9/2002 | Thorson et al. | |
| 2003/0078075 A1 | 4/2003 | Mcnicol | |
| 2003/0117953 A1 | 6/2003 | Kinahan et al. | |
| 2004/0165538 A1 | 8/2004 | Swami | |
| 2005/0227696 A1 | 10/2005 | Kaplan et al. | |
| 2006/0128394 A1 | 6/2006 | Turina et al. | |
| 2006/0166677 A1 | 7/2006 | Derakshan et al. | |
| 2006/0199608 A1 | 9/2006 | Dunn et al. | |
| 2007/0026854 A1 | 2/2007 | Nath | |
| 2007/0091847 A1 | 4/2007 | Lee | |
| 2007/0140163 A1 | 6/2007 | Meier et al. | |
| 2007/0184835 A1 | 8/2007 | Bitran et al. | |
| 2007/0253355 A1 | 11/2007 | Hande et al. | |
| 2007/0286092 A1 | 12/2007 | Famolari et al. | |
| 2008/0144577 A1 | 6/2008 | Huang et al. | |
| 2008/0200146 A1 | 8/2008 | Wang et al. | |
| 2009/0068970 A1 | 3/2009 | Ahmed et al. | |
| 2009/0088160 A1 | 4/2009 | Pani et al. | |
| 2009/0154423 A1 | 6/2009 | Song et al. | |
| 2009/0164813 A1 | 6/2009 | Tu et al. | |
| 2009/0209263 A1 | 8/2009 | Breuer et al. | |
| 2009/0252059 A1 | 10/2009 | Vigue et al. | |
| 2010/0003980 A1 * | 1/2010 | Rune | H04W 48/16 455/436 |
| 2010/0048205 A1 | 2/2010 | Guilford et al. | |
| 2010/0056153 A1 | 3/2010 | Attar et al. | |
| 2010/0056181 A1 | 3/2010 | Rippon et al. | |
| 2010/0110890 A1 | 5/2010 | Rainer et al. | |
| 2010/0136978 A1 | 6/2010 | Cho et al. | |
| 2010/0149971 A1 | 6/2010 | Noriega | |
| 2010/0216469 A1 | 8/2010 | Yi et al. | |
| 2010/0234021 A1 | 9/2010 | Ngai et al. | |
| 2010/0234042 A1 | 9/2010 | Chan et al. | |
| 2010/0255849 A1 | 10/2010 | Ore | |
| 2010/0267384 A1 | 10/2010 | Dwyer et al. | |
| 2010/0279601 A1 | 11/2010 | Phan et al. | |
| 2010/0296415 A1 | 11/2010 | Sachs et al. | |
| 2010/0296474 A1 | 11/2010 | Noriega | |
| 2010/0311435 A1 | 12/2010 | Mueck et al. | |
| 2010/0323701 A1 | 12/2010 | Enzmann | |
| 2011/0070863 A1 | 3/2011 | Ma et al. | |
| 2011/0072101 A1 | 3/2011 | Forssell et al. | |
| 2011/0075557 A1 | 3/2011 | Chowdhury et al. | |
| 2011/0105120 A1 | 5/2011 | Abdel-Samad | |
| 2011/0110300 A1 * | 5/2011 | Sachs | H04W 48/18 370/328 |
| 2011/0128907 A1 | 6/2011 | Kvernvik | |
| 2011/0142006 A1 | 6/2011 | Sachs | |
| 2011/0149879 A1 | 6/2011 | Noriega et al. | |
| 2011/0176424 A1 | 7/2011 | Yang et al. | |
| 2011/0235615 A1 | 9/2011 | Kalhan | |
| 2011/0261695 A1 | 10/2011 | Zhao et al. | |
| 2011/0263260 A1 | 10/2011 | Yavuz et al. | |
| 2011/0306386 A1 | 12/2011 | Centoza et al. | |
| 2012/0013504 A1 | 1/2012 | Raento et al. | |
| 2012/0021725 A1 | 1/2012 | Rune | |
| 2012/0057503 A1 | 3/2012 | Ding et al. | |
| 2012/0108252 A1 | 5/2012 | Dimou et al. | |
| 2012/0142352 A1 | 6/2012 | Zhang et al. | |
| 2012/0166604 A1 | 6/2012 | Fortier et al. | |
| 2012/0195290 A1 | 8/2012 | Bienas | |
| 2012/0214525 A1 | 8/2012 | Fujii et al. | |
| 2012/0236717 A1 | 9/2012 | Saska et al. | |
| 2012/0258674 A1 | 10/2012 | Livet et al. | |
| 2012/0258715 A1 | 10/2012 | Souissi et al. | |

(56) References Cited

U.S. PATENT DOCUMENTS

| | | | |
|---|---|---|---|
| 2012/0264412 A1 | 10/2012 | Tervonen et al. | |
| 2012/0275371 A1 | 11/2012 | Somasundaram et al. | |
| 2012/0294293 A1 | 11/2012 | Kahn et al. | |
| 2012/0315905 A1 | 12/2012 | Zhu et al. | |
| 2012/0324100 A1* | 12/2012 | Tomici | H04L 45/123 709/224 |
| 2013/0005344 A1 | 1/2013 | Dimou et al. | |
| 2013/0012182 A1 | 1/2013 | Liao | |
| 2013/0021929 A1 | 1/2013 | Kim | |
| 2013/0021962 A1 | 1/2013 | Hu et al. | |
| 2013/0023302 A1 | 1/2013 | Sivanesan et al. | |
| 2013/0028081 A1 | 1/2013 | Yang et al. | |
| 2013/0028184 A1 | 1/2013 | Lee et al. | |
| 2013/0029708 A1 | 1/2013 | Fox et al. | |
| 2013/0034019 A1* | 2/2013 | Mustajarvi | H04W 48/16 370/254 |
| 2013/0045740 A1 | 2/2013 | Gayde et al. | |
| 2013/0051379 A1 | 2/2013 | Wang et al. | |
| 2013/0053038 A1 | 2/2013 | Lee et al. | |
| 2013/0065562 A1 | 3/2013 | Singh | |
| 2013/0065585 A1 | 3/2013 | Pelletier et al. | |
| 2013/0065589 A1 | 3/2013 | Lee et al. | |
| 2013/0084849 A1 | 4/2013 | Koskinen et al. | |
| 2013/0111038 A1 | 5/2013 | Girard | |
| 2013/0121145 A1 | 5/2013 | Draznin et al. | |
| 2013/0121322 A1 | 5/2013 | Salkintzis | |
| 2013/0143526 A1 | 6/2013 | Kanugovi et al. | |
| 2013/0143542 A1 | 6/2013 | Kovvali et al. | |
| 2013/0155849 A1 | 6/2013 | Koodli et al. | |
| 2013/0165131 A1 | 6/2013 | Garcia Martin et al. | |
| 2013/0170351 A1 | 7/2013 | Reznik et al. | |
| 2013/0176988 A1 | 7/2013 | Wang et al. | |
| 2013/0183976 A1 | 7/2013 | Zhuang et al. | |
| 2013/0188499 A1 | 7/2013 | Mach et al. | |
| 2013/0189996 A1 | 7/2013 | Sridhar et al. | |
| 2013/0208696 A1 | 8/2013 | Garcia Martin et al. | |
| 2013/0210434 A1 | 8/2013 | Dimou et al. | |
| 2013/0230011 A1 | 9/2013 | Rinne et al. | |
| 2013/0308445 A1 | 11/2013 | Xiang et al. | |
| 2013/0322238 A1 | 12/2013 | Sirotkin | |
| 2014/0016487 A1 | 1/2014 | Dorenbosch | |
| 2014/0029420 A1 | 1/2014 | Jeong et al. | |
| 2014/0040504 A1* | 2/2014 | Gupta | H04W 4/70 709/244 |
| 2014/0092306 A1 | 4/2014 | Lee et al. | |
| 2014/0092734 A1 | 4/2014 | Ljung | |
| 2014/0099945 A1 | 4/2014 | Singh et al. | |
| 2014/0128074 A1 | 5/2014 | Vangala et al. | |
| 2014/0141785 A1 | 5/2014 | Wang et al. | |
| 2014/0161256 A1 | 6/2014 | Bari et al. | |
| 2014/0204745 A1 | 7/2014 | Nuss | |
| 2014/0247810 A1 | 9/2014 | Bontu et al. | |
| 2014/0274066 A1 | 9/2014 | Fodor et al. | |
| 2014/0293982 A1* | 10/2014 | Gupta | H04W 48/16 370/338 |
| 2014/0295913 A1* | 10/2014 | Gupta | H04W 72/0413 455/552.1 |
| 2014/0335870 A1 | 11/2014 | Yilmaz et al. | |
| 2015/0119101 A1* | 4/2015 | Cui | H04W 48/18 455/525 |
| 2015/0141013 A1* | 5/2015 | Cui | H04W 48/20 455/436 |
| 2015/0208280 A1 | 7/2015 | Lorca Hernando | |
| 2015/0244520 A1 | 8/2015 | Kariman | |
| 2017/0006528 A1* | 1/2017 | Bari | H04W 48/16 |
| 2017/0094025 A1* | 3/2017 | Gupta | H04L 67/34 |

FOREIGN PATENT DOCUMENTS

| | | |
|---|---|---|
| EP | 2197228 | 12/2011 |
| EP | 2533571 | 12/2012 |
| EP | 2632072 | 8/2013 |
| EP | 2603046 | 12/2013 |
| WO | WO2010130134 | 11/2010 |
| WO | WO2011053204 | 5/2011 |
| WO | WO2012121757 | 9/2012 |
| WO | WO2012149954 | 11/2012 |
| WO | WO2012168152 | 12/2012 |
| WO | WO2013127691 | 9/2013 |

OTHER PUBLICATIONS

U.S. Office Action dated Oct. 6, 2016 in U.S. Appl. No. 13/707,539.
U.S. Office Action dated Aug. 12, 2016 in U.S. Appl. No. 13/707,551.
U.S. Appl. No. 13/707,531, filed Dec. 6, 2012.
U.S. Appl. No. 13/707,551, filed Dec. 6, 2012.
U.S. Appl. No. 13/707,532, filed Dec. 6, 2012.
U.S. Appl. No. 13/707,534, filed Dec. 6, 2012.
U.S. Appl. No. 13/707,535, filed Dec. 6, 2012.
U.S. Appl. No. 13/707,538, filed Dec. 6, 2012.
U.S. Appl. No. 13/707,539, filed Dec. 6, 2012.
U.S. Appl. No. 13/681,141, filed Nov. 19, 2012.
U.S. Appl. No. 13/748,454, filed Jan. 23, 2013.
U.S. Appl. No. 14/035,584, filed Sep. 24, 2013.
U.S. Appl. No. 14/059,401, filed Oct. 21, 2013.
U.S. Appl. No. 14/084,578, filed Nov. 19, 2013.
U.S. Appl. No. 14/520,020, filed Oct. 21, 2014.
U.S. Office Action dated Jun. 27, 2012 in U.S. Appl. No. 12/946,611.
U.S. Office Action dated Mar. 22, 2012 in U.S. Appl. No. 12/946,611.
U.S. Notice of Allowance dated Nov. 2, 2012 in U.S. Appl. No. 12/946,611.
U.S. Office Action dated Mar. 13, 2012 in U.S. Appl. No. 12/624,643.
U.S. Notice of Allowance dated Aug. 8, 2012 in U.S. Appl. No. 12/624,643.
U.S. Office Action dated Sep. 13, 2013 in U.S. Appl. No. 13/681,141.
U.S. Office Action dated Apr. 22, 2013 in U.S. Appl. No. 13/681,141.
U.S. Office Action dated Apr. 7, 2014 in U.S. Appl. No. 13/681,141.
U.S. Office Action dated Mar. 12, 2014 in U.S. Appl. No. 13/707,551.
U.S. Office Action dated Sep. 30, 2015 in U.S. Appl. No. 13/707,551.
U.S. Office Action dated Mar. 4, 2015 in U.S. Appl. No. 13/707,534.
U.S. Office Action dated Jul. 20, 2015 in U.S. Appl. No. 13/707,534.
U.S. Office Action dated Nov. 16, 2015 in U.S. Appl. No. 13/707,534.
U.S. Office Action dated Jun. 24, 2014 in U.S. Appl. No. 13/707,532.
U.S. Office Action dated Nov. 17, 2014 in U.S. Appl. No. 13/707,535.
U.S. Office Action dated May 12, 2015 in U.S. Appl. No. 13/707,535.
U.S. Office Action dated Sep. 30, 2015 in U.S. Appl. No. 13/707,535.
U.S. Office Action dated Dec. 24, 2014 in U.S. Appl. No. 13/707,531.
U.S. Office Action dated Jul. 9, 2015 in U.S. Appl. No. 13/707,531.
U.S. Office Action dated Nov. 16, 2015 in U.S. Appl. No. 13/707,531.
U.S. Office Action dated Dec. 10, 2014 in U.S. Appl. No. 13/707,551.
U.S. Office Action dated Mar. 24, 2015 in U.S. Appl. No. 13/707,551.
U.S. Office Action dated Dec. 24, 2014 in U.S. Appl. No. 13/707,538.
U.S. Office Action dated Jul. 1, 2015 in U.S. Appl. No. 13/707,538.
U.S. Notice of Allowance dated Nov. 16, 2015 in U.S. Appl. No. 13/707,538.
U.S. Office Action dated Jan. 22, 2015 in U.S. Appl. No. 13/707,539.
U.S. Office Action dated Sep. 17, 2015 in U.S. Appl. No. 13/707,539.
U.S. Office Action dated Jan. 22, 2015 in U.S. Appl. No. 14/059,401.
U.S. Office Action dated Feb. 19, 2015 in U.S. Appl. No. 14/084,578.
U.S. Office Action dated Jun. 17, 2015 in U.S. Appl. No. 14/084,578.
U.S. Office Action dated May 11, 2015 in U.S. Appl. No. 14/064,329.
U.S. Notice of Allowance dated Aug. 26, 2015 in U.S. Appl. No. 14/064,329.
U.S. Office Action dated May 19, 2015 in U.S. Appl. No. 14/035,584.
U.S. Office Action dated Sep. 18, 2015 in U.S. Appl. No. 14/520,020.
Feng, S. et al., "Self-Organizing Networks (SON) in 3GPP Long Term Evolution," Novel Mobile Radio Research, May 20, 2008.
Greenpacket, "Wi-Fi Offload: Authentication and Security Through EAP-Based Approach," Interface, May 2012.
"Universal Mobile Telecommunications System (UMTS); LTE; Access Network Discovery and Selection Function (ANDSF) Management Object (MO)," 3GPP TS 24.312, ETSI TS 124 312 v11.4.0 (Oct. 2012).
Desta Haileselassie Hagos, Rudiger Kapitza, "Study on Performance-Centric Offload Strategies for LTE Networks," TU Braunschweig, Wireless and Mobile Networking Conference (WMNC), 2013 6th Joint IFIP, 2013.

(56) References Cited

OTHER PUBLICATIONS

Desta Haileselassie Hagos, "The Performance of WiFi Offload in LTE Networks," Master's Thesis, Lulea University of Technology, Jun. 2012.

Heinonen et al., "Advanced EPC Architecture for Smart Traffic Steering," MEVICO, Nov. 2011.

ETSI, "Universal Mobile Telecommunications System (UMTS); LTE; Access Network Discovery and Selection Function (ANDSF) Management Object (MO)," Apr. 2013, Version 11.6.0, Release 11, France.

Desh, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/. Last accessed Feb. 15, 2011, 10 pages.

Nicole Casal Moore, "Tiny Generators run on good vibrations". Copyright 2009-2011 Futurity.org. http://www.futurity.org/science-technology/tiny-generators-run-on-good-vibrations/. Last accessed Feb. 15, 2011, 5 pages.

Noel McKeegan, "Good vibrations: tiny generator harnesses kinetic energy to power wireless electrical systems". Copyright gizmag 2003-2011. http://www.gizmag.com/go/7584/. Last accessed Feb. 15, 2011, 4 pages.

S.P. Beeby, et al., "Kinetic Energy Harvesting". ACT Workshop on Innovative Concepts. ESA-ESTEC Jan. 28-29, 2008. http://www.esa.int/gsp/ACT/events/workshops/ACT-ART-Bridge2Space-Beeby.pdf. Last accessed Feb. 15, 2011, 10 pages.

"Directory:Human-Powered". http://peswiki.com/index.php/Directory:Human-Powered. Last accessed Feb. 15, 2011, 11 pages.

Alkhawlani et al., "Intelligent radio network selection for next generation networks," Informatics and Systems (INFOS), 2010 The 7th International Conference on, 2010, pp. 1, 7, 28-30.

Changqing et al., "Optimal Channel Access for TCP Performance Improvement in Cognitive Radio Networks: A Cross-Layer Design Approach," Global Telecommunications Conference, 2009. Globecom 2009. IEEE, 2009, pp. 1, 6.

Samdanis et al., "Traffic Offload Enhancements for eUTRAN," Communications Surveys & Tutorials, IEEE, 2012, vol. 14, No. 3, pp. 884,896.

Watanabe et al., "Radio network selection scheme notified by the each network's real-time performance in the multi-layered communication network," Wireless Personal Multimedia Communications (WPMC), 2012 15th International Symposium on, 2012, pp. 169, 171, 24-27.

Kwon et al., "Load Based Cell Selection Algorithm for Faulted Handover in Indoor Femtocell Network," Vehicular Technology Conference (VTC Spring), 2011 IEEE 73rd, 2011, pp. 1, 5, 15-18.

Wei et al., "A mobility load balancing optimization method for hybrid architecture in self-organizing network," Communication Technology and Application (ICCTA 2011), IET International Conference on, 2011, pp. 828, 832.

"Macro to small cell, metro cell Hand-in" Alcatel-Lucent, AT&T R3-112026, http://www.3gpp.org/ftp/Specs/html-info/TDocExMtg--R3-73--28511.htm.

Stemm, Mark, and Randy H. Katz. "Vertical handoffs in wireless overlay networks." Mobile Networks and applications 3.4 (1998): 335-350. http://morse.colorado.edu/~timxb/5520/ho/8.pdf.

Chiu, Ming-Hsing, and Mostafa A. Bassiouni. "Predictive schemes for handoff prioritization in cellular networks based on mobile positioning." Selected Areas in Communications, IEEE Journal on 18.3 (2000): 510-522. http://dx.doi.org/10.1109/49.840208.

Soh, Wee-Seng, and Hyong S. Kim. "QoS provisioning in cellular networks based on mobility prediction techniques." Communications Magazine, IEEE 41.1 (2003): 86-92. http://citeseerx.ist.psu.edu/viewdoc/download?doi=10.1.1.98.2622&rep=rep1&type=pdf.

Pollini, Gregory P. "Trends in handover design." Communications Magazine, IEEE 34.3 (1996): 82-90. http://inrg.csie.ntu.edu.tw/course/wms/paper/Pollin96.pdf.

Raza, Syed Numan, "LTE Performance Study," Master of Science Thesis, Feb. 9, 2012.

Jin et al., "SoftCell: Taking Control of Cellular Core Networks," May 15, 2013, Princeton University, Bell Labs.

Bernardos, Carlos J., "Final architecture design," Seventh Framework Programme, 2012, Medieval.

Stavroulaki et al., "Cognitive Control Channels: From Concept to Identification of Implementation Options," IEEE Communications Magazine, Jul. 2012, pp. 96-108, IEEE.

Office Action dated Feb. 25, 2016 in U.S. Appl. No. 13/707,535.

Notice of Allowance dated Dec. 14, 2015 in U.S. Appl. No. 14/035,584.

U.S. Office Action dated Mar. 22, 2017 in U.S. Appl. No. 13/707,551.

U.S. Office Action dated Nov. 8, 2017 in U.S. Appl. No. 13/707,539.

U.S. Office Action dated Oct. 17, 2017 in U.S. Appl. No. 14/980,366.

U.S. Office Action dated Dec. 12, 2017 in U.S. Appl. No. 14/084,578.

\* cited by examiner

ACCESS NETWORK DISCOVERY AND SELECTION FUNCTION ENHANCEMENT WITH CELL-TYPE MANAGEMENT OBJECT

CROSS-REFERENCE TO RELATED APPLICATIONS

This application is a continuation of and claims priority to U.S. patent application Ser. No. 14/064,329, now U.S. Pat. No. 9,241,305, entitled "Access Network Discovery and Selection Function Enhancement With Cell-Type Management Object," filed Oct. 28, 2013, which is incorporated herein by reference in its entirety.

BACKGROUND

In recent years, mobile telecommunications carriers have experienced a dramatic increase in traffic on their networks, and this trend will likely continue. This increase in traffic has been caused in part by the increased adoption of smartphones and other devices that rely on mobile telecommunications networks, and the migration of many customers from utilizing landline telecommunication services to utilizing mobile telecommunication services for their communications needs. To meet the demands of higher traffic and to improve the end user experience, mobile telecommunications carriers are examining mechanisms by which to improve network efficiency, network capacity, and the end user experience, while keeping operational costs at a level conducive to maintaining competitive rates for the services they provide.

SUMMARY

Concepts and technologies described herein relate to an enhancement to an access network discovery and selection function ("ANDSF") with a cell-type management object ("MO") within an ANDSF MO tree. According to one aspect disclosed herein, a system including an ANDSF can generate a policy for network selection and traffic steering. The policy can include network selection criteria based upon a cell-type. The system can send the policy to a mobile device. The mobile device can utilize the policy to select a network and intelligently steer traffic to the selected network. As used herein, network selection includes aspects of selecting networks that utilize different radio interfaces (e.g., wireless local area network and cellular) and steering traffic across different radio interfaces.

According to another aspect disclosed herein a mobile device can identify a policy to utilize for network selection. The policy can include network selection criteria based upon a cell-type and WI-FI availability. The mobile device can also select a network based upon the policy and connect to the selected network. In some embodiments, the mobile device selects the policy from a plurality of policies received from the system described above.

In some embodiments, the cell-type is a small cell cell-type, a macro cell cell-type, or a multi-standard metro cell ("MSMC") cell-type. In addition to cell-types, WI-FI access points may be identified to understand WI-FI availability. In some embodiments, the network selection criteria includes network load information, local device information, user profile information, or some combination thereof. In some embodiments, the cell-type is defined in a management object of an ANDSF MO tree.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
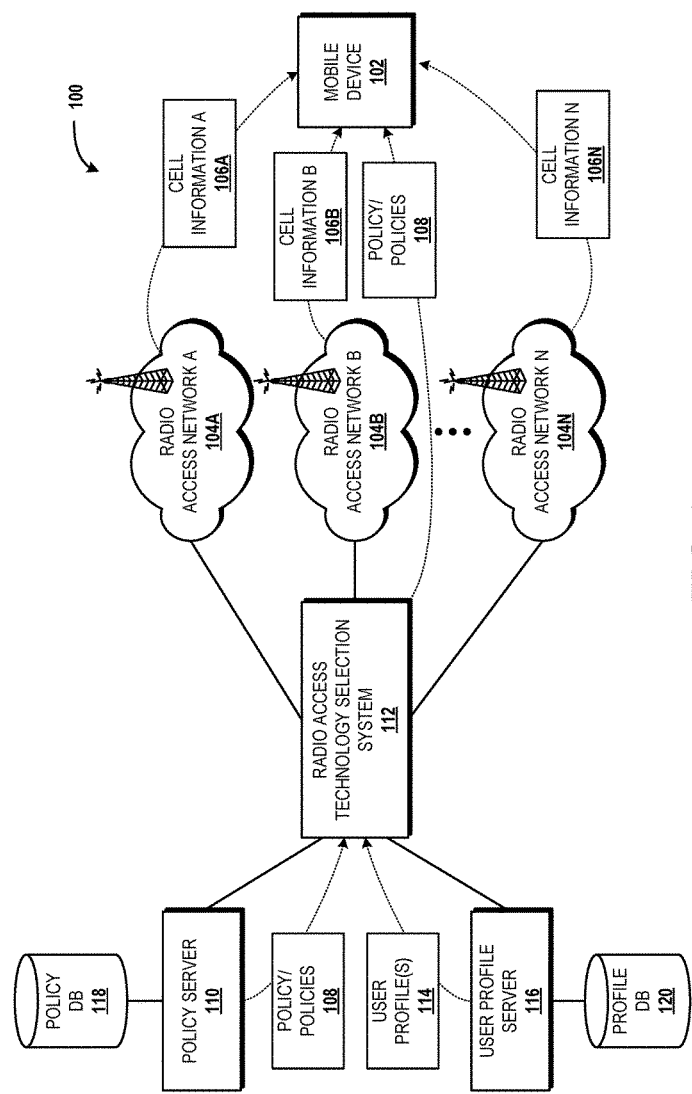
FIG. 1 is a block diagram illustrating aspects of an illustrative operating environment for various concepts disclosed herein.

Concepts and technologies described herein relate to an enhancement to an access network discovery and selection function ("ANDSF") with a cell-type management object ("MO") within an ANDSF MO tree. This enhancement enables a more flexible policy-based dynamic intelligent network selection platform that allows user Internet protocol ("IP") traffic to be routed to the best radio technology available based upon cell coverage characteristics of a camping/serving cell of a mobile device. Moreover, this enhancement helps ensure a robust policy-based network selection in a true heterogeneous network environment, within which various networks exist, including, for example, macro cell networks, small cell networks, wireless local area networks ("WLANs"), and white space networks, which may require different policies.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of an enhancement to an ANDSF with a cell-type MO within an ANDSF MO tree will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a mobile device 102 that is capable of connecting to and communicating with one or more radio access networks ("RANs") 104A-104N (hereinafter referred to collectively or generally as "RANs 104") to carry out voice and/or data communications with one or more other mobile devices, computers, servers, networking devices, and/or other networks (not shown). Although in the illustrated example the mobile device 102 is shown as being in communication with three RANs—RAN A 104A, RAN B 104B, and RAN N 104N—the mobile device 102 may be in communication with any number of RANs, and, at times, may be in simultaneous communication with multiple RANs, including RANs that utilize the same or different radio access technologies.

Each of the RANs 104 can include one or more cells having the same or different cell sizes, which may be represented by different cell-types. As used herein, a "cell" refers to a geographical area that is served by one or more base stations operating within a RAN. As used herein, a "base station" refers to a radio receiver and/or transmitter (collectively, transceiver) that is/are configured to provide a radio/air interface over which one or more mobile devices, such as the mobile device 102, can connect to a network. Accordingly, a base station is intended to encompass one or more base transceiver stations ("BTSs"), one or more Node-Bs, one or more eNode-Bs, one or more home eNode-Bs, one or more wireless access points ("APs"), one or more multi-standard metro cell ("MSMC") nodes, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the mobile device 102.

A cell-type can be associated with certain dimensional characteristics that define the effective radio range of a cell. A cell-type can additionally represent the radio access technology ("RAT") utilized by a cell. Cell-types can include, but are not limited to, a macro cell-type, a metro cell-type, a femto cell-type, a pico cell-type, a micro cell-type, wireless local area network ("WLAN") cell-type, a MSMC cell-type, and a white space network cell-type. For ease of explanation, a "small cell" cell-type is utilized herein to collectively refer to a group of cell-types that includes femto cell-type (e.g., home eNodeB), pico cell-type, and micro cell-type, in general contrast to a macro cell-type, which offers a larger coverage area. Other cell-types, including proprietary cell-types, temporary cell-types, and ad-hoc cell-types are also contemplated. An ad-hoc cell-type, for example, can include a mobile device, such as the mobile device 102, functioning as a "hotspot" for facilitating connectivity for other devices to connect to another potentially larger cell.

The mobile device 102 may be a cellular phone, a feature phone, a smartphone, a mobile computing device, a tablet computing device, a portable television, a portable video game console, or any other computing device that includes one or more radio access components that are capable of connecting to and communicating with one or more RANs via one or more radio access components. In some embodiments, the mobile device 102 includes an integrated or external radio access component that facilitates wireless communication with one or more RANs. The radio access component may be a cellular telephone that is in wired or wireless communication with the mobile device 102 to facilitate a tethered data connection to one or more RANs. Alternatively, the radio access component includes a wireless transceiver configured to send data to and receive data from one or more RANs and a universal serial bus ("USB") or another communication interface for connection to the mobile device 102 so as to enable tethering. In any case, the mobile device 102 can wirelessly communicate with one or more RANs over a radio/air interface in accordance with one or more RATs. The mobile device 102 may also initiate, receive, and maintain voice calls with one or more other voice-enabled telecommunications devices, such as other mobile devices or landline devices (not shown). The mobile device 102 may also exchange Short Message Service ("SMS") messages, Multimedia Message Service ("MMS") messages, email, and/or other messages with other devices (not shown).

As used herein, a RAN may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. A RAN can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the mobile device 102. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like.

A RAN can be part of one or more mobile telecommunications networks. As used herein, a mobile telecommunications network includes one or more RANs and a wireless wide area network ("WWAN"), which may include one or more core networks, such as, for example, a circuit-switched core network ("CS CN"), a packet-switched core network ("PS CN"), and/or an IP multimedia subsystem ("IMS") core network. A WWAN can utilize one or more mobile telecommunications technologies, such as those described above, to provide voice and/or data services via one or more RANs to one or more radio components of the mobile device 102. Moreover, a mobile telecommunications network can provide a connection to the Internet or other WAN so that the mobile device 102 can access Internet content, such as, for example, websites, streaming media, online video games, downloadable content, and the like.

In addition to or as an alternative to operating in accordance with one or more mobile telecommunications standards, one or more of the RANs 104 may operate in accordance with one or more Institute of Electrical and Electronic Engineers ("IEEE") 802.11 standards, such as, for example, IEEE 802.11a, 802.11b, 802.11g, 802.11n, 802.1ac and/or future 802.11 standard (referred to herein collectively as "WI-FI"). Draft 802.11 standards are also contemplated. A WI-FI network may be implemented utilizing one or more wireless WI-FI APs. In some implementations, one or more of the wireless WI-FI APs is a mobile device or other computing device that functions as a WI-FI hotspot. In some implementations, the mobile device 102 connects to a WI-FI network via one or more secure connections, each of which may utilize an encryption technology, such as, but not limited to, WI-FI Protected Access ("WPA"), WPA2, Wired Equivalent Privacy ("WEP"), and/or the like. Moreover, a WI-FI network can provide a connection to the Internet or other WAN so that the mobile device 102 can access Internet content, such as, for example, websites, streaming media, online video games, downloadable content, and the like.

As used herein, a RAT can refer to any mobile telecommunications standard or draft standard thereof, any IEEE 802.11 standard or draft standard thereof, or any other technology by which a mobile device, such as the mobile device 102, can wirelessly connect to and communicate over a network, such as one or more of the RANs 104.

The mobile device 102 can receive cell information 106A-106N (hereinafter referred to collectively or generally as "cell information 106") from one or more of the RANs 104. More particularly, the mobile device 102 can receive the cell information 106 from one or more cells of one or more of the RANs 104. The mobile device 102 can utilize the cell information 106, at least in part, to determine to which cell(s) within the RANs 104 to connect. The mobile device 102 can also receive one or more policies 108 from a policy server 110 via a RAT selection system 112. The RAT selection system 112 can utilize one or more user profiles 114 received from a user profile server 116 to select one or more policies 108 to be sent to the mobile device 102. The mobile device 102 can utilize the cell information 106 and the policy/policies 108 to determine to which cell(s) within the RAN(s) 104 to connect. The mobile device 102 can also utilize local device information, such as, but not limited to, mobility state information, performance measurement information, battery utilization information, application information, channel quality information, and/or a user override selection, to determine to which cell(s) within the RAN(s) 104 to connect. Additional details regarding local device information are provided below with reference to FIG. 2.

In some embodiments, the mobile device 102 is associated with multiple users. In these embodiments, the policy server 110 can determine the correct user profile of the user profiles 114 for the active user of the mobile device 102 and can send the correct user profile to the RAT selection system 112 so that the RAT selection system 112 can select the correct policy for the active user of the mobile device 102.

In some embodiments, the cell information 106 includes historic network load information. Historic network load information is used herein to describe data obtained by the RAT selection system 112 based upon network load experienced by one or more cells within one or more of the RANs 104 in the past or otherwise in non-real-time. In some embodiments, historic network load information is utilized by the RAT selection system 112 to identify one or more network load trends experienced by a RAN over a specified period of time. Network load information trends can be useful to the RAT selection system 112 to predict times during which network load is favorable or not to support communications with additional mobile devices.

In some embodiments, the cell information 106 includes current network load information. Current network load data is used herein to describe network load data that is obtained by the RAT selection system 112 based upon a network load experienced by one or more of the RANs 104 in real-time or near real-time. Real-time, in this context, is the actual time during which a network load is experienced by one or more of the RANs 104. Near real-time, in this context, is the actual time during which a network load is experienced by a RAN 104 plus a delay on the order of microseconds or milliseconds.

What constitutes near-real time network load information versus historic network load information can be defined by the owner and/or operator of the RAT selection system 112, a service provider providing service via one or more of the RANs 104, and/or another entity. It should be understood that real-time network load information associated with a real-time network load of one or more of the RANs 104 and near real-time network load information associated with a near real-time network load of one or more of the RANs 104 might be received by the RAT selection system 112 with delay caused by latency and/or other network phenomena. Moreover, this delay may increase with the additional time needed to provide the load information 106 to the RAT selection system 112.

The mobile device 102 can operate in an idle mode or a connected mode. When the mobile device 102 is in the idle mode, the cell in which the mobile device 102 is located is referred to as the current camping cell for the mobile device 102. In this case, other cells (e.g., one or more cells neighboring the current camping cell) may be considered by the mobile device 102 for selection as potential target camping cells. When the mobile device 102 is in the connected mode, the cell in which the mobile device 102 is located is referred to as the current serving cell for the mobile device 102. In this case, other cells (e.g., one or more cells neighboring the current camping cell) can be considered by the mobile device 102 for selection as target serving cells, such as the target of a handover operation conducted while the mobile device 102 travels between cells during an active voice call or other communication.

In some embodiments, load information includes a number of active devices (e.g., devices currently engaged in a call or data session). In some other embodiments, load information includes a number of idle devices (e.g., devices currently camping in a given cell). It is contemplated that load information can include both a number of active devices and a number of idle devices. In other words, load information can include active load information and idle load information. Load information can be conveyed as a percentage of load, a load level (e.g., low, medium, or high), or other formats, which may be proprietary to a given carrier. The mobile device 102 can utilize the active load information and/or the idle load information for selecting a target camping cell or selecting a target serving cell.

The cell information 106, in some embodiments, includes local cell information collected by one or more base stations operating within one or more of the RANs 104. The local cell information can include cell-type information associated with one or more cells. The local cell information can also include cell load information associated with one or more cells.

The mobile device 102 utilizes information contained within the cell information 106, at least in part, to select a neighbor cell as the target camping cell or target serving cell. The mobile device 102 can also utilize local device information, such as, but not limited to, mobility state information, performance measurement information, battery utilization information, application information channel quality information, and/or a user override selection, in a decision to select the target camping or serving cell, as will be described in greater detail below with reference to FIG. 2.

The cell information 106, in some embodiments, includes cell-type information that identifies a cell as being of a particular cell-type. Cell-types can include, but are not limited to, a macro cell-type, a metro cell-type, a femto cell-type, a pico cell-type, a micro cell-type, WLAN cell-type, a MSMC cell-type, and a white space network cell-type. For ease of explanation, a "small cell" cell-type is utilized herein to collectively refer to a group of cell-types that includes femto cell-type, pico cell-type, and micro cell-type, in general contrast to a macro cell-type, which offers a larger coverage area. Other cell-types, including proprietary cell-types, temporary cell-types, and ad-hoc cell-types are also contemplated. An ad-hoc cell-type, for example, can include a mobile device, such as the mobile device 102, functioning as a "hotspot" to facilitate connectivity for other devices to connect to another potentially larger cell.

Cell-type information included in the cell information 106 can identify a cell as being of a particular cell type. The cell information 106 can include an explicit specification of a cell-type of one or more cells. For example, the cell information 106 may include text that explicitly names the cell-type for a given cell. As another example, the cell information 106 may include a code or identifier by which the mobile device 102 can ascertain the cell-type of one or more cells. In this example, the mobile device 102 may have a table or other data structure by which to cross-reference cell-type codes or identifiers with cell-types.

The cell information 106 may be sent to the mobile device 102 in one or more messages, which can be any message type that is capable of being sent to the mobile device 102 from a base station over a radio/air interface. A message that includes at least a portion of the cell information 106 can be sent to the mobile device 102 using any physical, transport, and/or logical channels. These channel types are generally known and therefore not described in greater detail herein.

In some embodiments, the cell information 106 is included in a System Information Block ("SIB"). In some other embodiments, the cell information 106 is included in a SIB that contains other information. The SIB may be a new SIB configured to include cell-type information associated with one or more cells. Alternatively, the SIB may be an existing SIB that has been modified to include cell-type information associated with one or more cells.

In some embodiments, the cell information 106 is included in an SMS message. In some other embodiments, the cell information 106 is included in an SMS Cell Broadcast ("SMS-CB"). In some other embodiments, the cell information 106 is included in a SMS Peer-to-Peer ("SMPP") message. The cell information 106 may be sent to the mobile device 102 via other messaging services, including, but not limited to, MMS, Wireless Application Protocol ("WAP") push message, Unstructured Supplementary Service Data ("USSD"), or any combination thereof. It should be understood that network elements, such as Short Message Service Centers ("SMSCs"), Multimedia Message Service Centers ("MNISCs"), WAP servers, USSD servers, and the like, that support the aforementioned messaging services are not illustrated merely for ease of description.

Cell-type information can be conveyed to the mobile device 102 using existing information, such as, but not limited to, Location Area Identity ("LAI"), Cell Identity ("CID"), Routing Area Identity ("RAI"), Tracking Area Identity ("TAI"), Physical Cell Identity ("PCP"), or some combination thereof. In these embodiments, the mobile device 102 can use one or more of these identities to determine the cell-type of one or more cells, for example, utilizing a table or other data structure stored on or otherwise accessible by the mobile device 102.

A cell-type can be associated with a particular identity or range of identities of one or more of the above identities. For example, an ID range of 100-49,999 may be assigned to macro cells, an ID range of 50,000-200,000 may be assigned to metro cells, and so on. The mobile device 102 can utilize an LAI, CID, RAI, TAI, or some combination thereof to determine a cell-type for the cell(s) associated with one or more of these IDs.

In some embodiments, base stations operating within the RANs 104 can learn cell-type information and/or load information from one or more neighboring base stations. A base station may learn cell-type information and/or load information via a self-organizing network or self-optimizing network feature such as provided by $3^{rd}$ Generation Partnership Project ("3GPP") and/or New Generation Mobile Networks ("NGMN"). In particular, a base station can utilize the Automatic Neighbor Relation ("ANR") detection feature of LTE to detect one or more neighboring eNode-Bs and collect a portion of the cell information 106 therefrom. Other mechanisms by which a base station can learn load information from one or more neighboring cells are contemplated.

As used herein, the term "policy," such as the policy 108, refers to one or more settings, one or more configurations, one or more rules, and/or the like that define, at least in part, one or more methods of action in light of one or more conditions to be used in a determination made by the mobile device 102 regarding to which RAN(s) of the RANs 104 to connect. In some embodiments, a policy is defined by or for the RAT selection system 112, which may be or may include an ANDSF. In these embodiments, a policy is cell-type specific and is defined through an ANDSF MO tree that includes a plurality of MOs, including a cell-type MO to identify the RAN(s) a mobile device, such as the mobile device 102, should connect to based, at least in part, upon the cell-type of the camping/serving cell of the mobile device. Adding a cell-type specific MO to the ANDSF MO tree enables a more flexible policy-based dynamic intelligent network selection platform that allows user IP traffic to be routed to the best radio technology available based upon cell coverage characteristics of a camping/serving cell of a mobile device. Moreover, adding a cell-type specific MO to the ANDSF MO tree helps ensure a robust policy-based network selection in a true heterogeneous network environment, within which various networks exist, including, for example, macro cell networks, small cell networks, WLANs, and white space networks, which may require different policies.

In some embodiments, a policy includes one or more rules that specify one or more if-then conditions by which to handle a particular situation, such as redirecting network traffic based upon network load experienced by one or more of the RANs 104 and reported to the mobile device 102 as part of the cell information 106. In some other embodiments, a policy includes one or more matrices of cause and effect conditions, tables of actions, or the like for responding to or otherwise dealing with certain stimuli, such as network conditions evidenced by the cell information 106, the user profiles 114, and/or other stimuli.

The policies 108 can be stored in a policy database 118. The policy database 118 may be separate from and in communication with the policy server 110 as in the illustrated embodiment, or alternatively, may be provided as part of the policy server 110. In any case, the policy server 110 can obtain the policies 108 from the policy database 118 and send the policies 108 to the RAT selection system 112 in response to a request received from the RAT selection system 112, periodically, or in response to an event, such as a change to one or more of the policies 108. In some embodiments, the policy server 110 is configured to provide the policies 108 directly to the mobile device 102 without interaction with the RAT selection system 112.

The user profiles 114 can be stored in a profile database 120. The profile database 120 may be separate from and in communication with the user profile server 116 as in the illustrated embodiment, or alternatively may be provided as part of the user profile server 116. In any case, the user profile server 116 can obtain the user profiles 114 in response to a request received from the RAT selection system 112, periodically, or in response to an event, such as a change to one or more of the user profiles 114. In some embodiments, the user profile server 116 is configured to provide the user profiles 114 directly to the mobile device 102 without interaction with the RAT selection system 112.

As used herein, the term "user profile" refers to a collection of data associated with a user that accesses one or more of the RANs 104 via a device such as the mobile device 102. A user in this context refers to an individual or other entity. A user profile can define information regarding a service agreement between a user and one or more service providers that provide telecommunications service, at least in part, via one or more of the RANs 104. The service agreement may include terms of service for pre-paid and/or post-paid service. The service agreement may include terms of roaming agreements between two or more mobile telecommunications carriers. The service agreement may define a service tier for the user. A service tier may establish a priority for a user in regard to utilizing network resources to connect to one or more of the RANs 104 via the mobile device 102.

In some embodiments, the RAT selection system 112 is owned and/or operated by an owner and/or operator of one or more of the RANs 104. In some embodiments, the policy server 110 is owned and/or operated by an owner and/or operator of one or more of the RANs 104. In some embodiments, the user profile server 116 is owned and/or operated by an owner and/or operator of one or more of the RANs 104. In some embodiments, the RAT selection system 112 includes the policy server 112 and/or the user profile server 116.

It should be understood that some implementations of the operating environment 100 include multiple mobile devices 102, multiple RAT selection systems 112, multiple policy servers 110, multiple policy databases 118, multiple user profile servers 116, and/or multiple profile databases 120. Moreover, the RAT selection system 112, the policy server 110, and/or the user profile server 116 may be provided as part of one or more distributed computing systems. Thus, the illustrated embodiment should be understood as being illustrative, and should not be construed as being limiting in any way.

Figure 2:
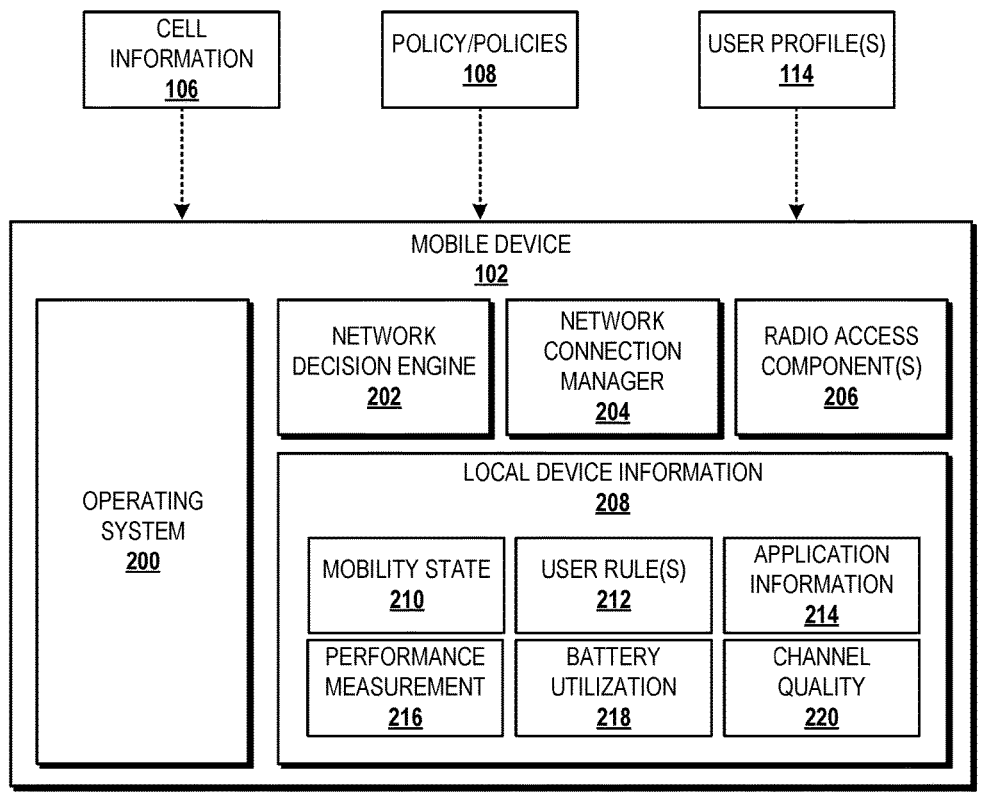
FIG. 2 is a block diagram illustrating aspects of a mobile device, according to an illustrative embodiment.

Turning now to FIG. 2, a block diagram illustrating additional aspects of the mobile device 102 will be described, according to an illustrative embodiment. In the illustrated embodiment, the mobile device 102 receives the cell information 106, the policies 108, and the user profiles 114, and utilizes the policies 108 to determine to which RAN(s) of the RANs 104 the mobile device 102 should connect, and more particularly, to which cell within the selected RAN(s) of the RANs 104. In addition to the policies 108, the mobile device 102 can utilize the cell information 106 and/or the user profiles 114 in making the above determination.

The illustrated mobile device 102 includes an operating system 200, a device-based network decision manager 202, a network connection manager 204, one or more radio access components 206, and local device information 208. The operating system 200 is a program for controlling the operation of the mobile device 102. The operating system 200 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The network decision engine 202 utilizes one or more of the policies 108 alone, or in a combination with at least a portion of the cell information 106, at least a portion of the user profile(s) 114, and/or at least a portion of the local device information 208 to make a determination regarding to which of the RAN(s) 104, and more particularly to which cell within the RAN(s) 104, the mobile device 102 should connect. In some embodiments, the network decision engine 202 is an application program that includes computer-executable instructions that, when executed by one or more processors of the mobile device 102, cause the mobile device 102 to analyze one or more of the policies 108 alone, or in a combination with at least a portion of the cell information 106, at least a portion of the user profile(s) 114, and/or at least a portion of the local device information 208 to select one or more of the RANs 104, and to instruct the mobile device 102, and more particularly, the network connection manager 204, to establish a connection to the selected RAN(s) via the radio access component(s) 206.

The network connection manager 204 can manage all or a portion of the network connections available to the mobile device 102 at a given time. The network connections can include, for example, connections established via the radio access components 206, which may be or may include one or more WI-FI radios, one or more cellular radios, and/or other radios suited for the RATs described herein above. In some embodiments, the network connection manager 204 is included as part of the operating system 200 and/or another application stored on the mobile device 102, such as the network decision engine 202.

In some embodiments, the cell information 106 includes network load trend information for one or more of the RANs 104 and/or current network load information for one or more of the RANs 104. In some embodiments, network load trend information is received from one or more of the RANs 104 via periodic network load updates, such as every fifteen minutes or some other time period. In some embodiments, current network load information is received from one or more of the RANs 104 in an event-driven network load update. An event-driven network load update may be triggered at a RAN due to the network load experienced by that RAN meeting or exceeding a pre-defined network load threshold. In some embodiments, the mobile device 102 can request the current network load information if needed by the network decision engine 202 to select one or more of the RANs 104. The cell information 106 can include network load information received via periodic network load updates and/or event-driven network load updates. The cell information 106 may be stored in a database that is external to and in communication with the mobile device 102. In these implementations, the mobile device 102 may receive the cell information 106 via one or more wired or wireless communication links with the database.

The illustrated local device information 208 includes mobility state information 210, one or more user rules 212, application information 214, performance measurement information 216, battery utilization information 218, and channel quality information 220. The aforementioned local device information types are merely illustrative of some contemplated information that may be used in accordance with various embodiments of the concepts and technologies described herein for selecting a network and therefore should not be construed as being limiting in any way.

The mobility state information 210 can include the speed at which the mobile device 102 is currently moving, a movement pattern of the mobile device 102, and/or any other information associated with movement or non-movement of the mobile device 102. The mobility state information 210 may be obtained by an accelerometer, global positioning system ("GPS") component, other motion sensor or component of the mobile device 102, or some combination thereof. The mobility state information 210 can be utilized by the network decision engine 202 to determine if it is appropriate for the mobile device 102 to connect to a network given the movement or non-movement of the mobile device 102. For example, if the mobility state information 210 indicates that the mobile device 102 is moving at 60 miles per hour and a WI-FI network is available to the mobile device 102, the network decision engine 202 can determine to forego connecting to the WI-FI network based upon the relatively fast movement of the mobile device 102, and the prediction that the mobile device 102 will not be within range of the WI-FI network for a sufficient amount of time to handle voice and/or data communications between the mobile device 102 and the WI-FI network. Alternatively, for example, if the mobility state information 210 indicates that the mobile device is stationary and a WI-FI network is available to the mobile device 102, the network decision engine 202 can determine to connect to the WI-FI network based upon the stationary state of the mobile device 102 and the prediction that the mobile device 102 will be within range of the WI-FI network for a sufficient amount of time to handle voice and/or data communications between the mobile device 102 and the WI-FI network.

The user rule(s) 212 can include rules regarding the selection of one or more of the RANs 104 specified by or for a user of the mobile device 102. For example, a user rule may specify an override selection of a network that should be selected if the network is available. An override selection can be conditional. In some embodiments, the user rule(s) 212 are overridden by the policies 108. In some other embodiments, the user rule(s) 212 override the policies 108.

The user rule(s) 212 can include user preferences. A user can provide one or more preferences, which can be considered along with other information disclosed herein when selecting one or more of the RANs 104. For example, a user might provide a user preference that specifies the user's desire to have his or her mobile device connect to a certain WI-FI network, such as the user's home WI-FI network, whenever the mobile device is within range of the user's home WI-FI network. As another example, a user might provide a user preference that specifies the user's desire to have his or her mobile device connect to the cheapest RAN (e.g., free WI-FI versus paid cellular) available at all times or during one or more specified times. As another example, a user might provide a user preference that specifies the user's desire to have his or her mobile device connect to the RAN that provides the highest throughput at all times or during one or more specified times. As another example, a user might provide a user preference that specifies the user's desire to have his or her mobile device connect to the RAN that will provide the most consistence user experience. The above preferences can be combined in any way. Moreover, one or more of the aforementioned preferences can be utilized with operator defined policies, mobility state information, subscription profile information, and/or other information described herein when selecting one or more RANs.

The application information 214 can include an indication of one or more applications that are installed on the mobile device 102. In some embodiments, the application information 214 includes information regarding one or more active applications that are currently utilizing processor, memory, and/or other resources of the mobile device 102. In some embodiments, the application information 214 is received by the network decision engine 202 from the operating system 200, and more particularly, a resource management function of the operating system 200. The network decision engine 202 can utilize the application information 214 in a determination of which network to select based, at least in part, upon voice and/or data communications originating from and/or directed to one or more active applications. For example, if a video streaming application is active on the mobile device 102, the network decision engine 202 can determine to select a network that has sufficient bandwidth resources to support streaming video to the mobile device 102. In addition to or as an alternative to specific applications, the network decision engine 202 can consider application types or classes.

The performance measurement information 216 can include round-trip time ("RTT"), received signal strength indicator ("RSSI"), throughput, latency, and/or other performance measurements obtained by or for the mobile device 102. In some embodiments, the mobile device 102 performs one or more tests to obtain the performance measurement information 216. The tests may be performed by standalone test applications executing on the mobile device 102, the operating system 200, the network decision engine 202, and/or the network connection manager 204. By way of example and not limitation, illustrative tests include throughput tests, latency tests, call tests, SMS tests, multiple radio access bearer ("mRAB") tests (e.g., simultaneous voice and data tests), voice over Internet protocol ("VoIP"), video mean opinion score ("MOS"), or idle tests.

The battery utilization information 218 can include information such as, but not limited to, a current, a voltage, a temperature, a percentage of battery used, a percentage of battery remaining, a battery condition, a remaining time, and a remaining capacity (e.g., in watt hours). In some embodiments, the battery utilization information 218 is obtained from a battery gauge of the mobile device 102 that measures the effect of a battery's discharge rate, temperature, age, and/or other factors to predict the remaining life within a certain percentage of error.

The channel quality information 220 can include a channel quality indicator ("CQI") or other measurement that is indicative of the quality of a given channel over which the mobile device 102 can communicate. In some embodiments, a CQI is calculated based at least in part upon the channel quality information 220 includes a signal-to-noise ("SNR"), a signal-to-interference plus noise ratio ("SINR"), a signal-to-noise plus distortion ratio ("SNDR"), and/or the like for a given channel.

The local device information 208 can also include device type information (not shown). Device types can include, but are not limited to, feature phones, smartphones, machine-to-machine devices, tablets, and the like. In some embodiments, one or more policies can be defined directing that use with certain device types.

Figure 3:
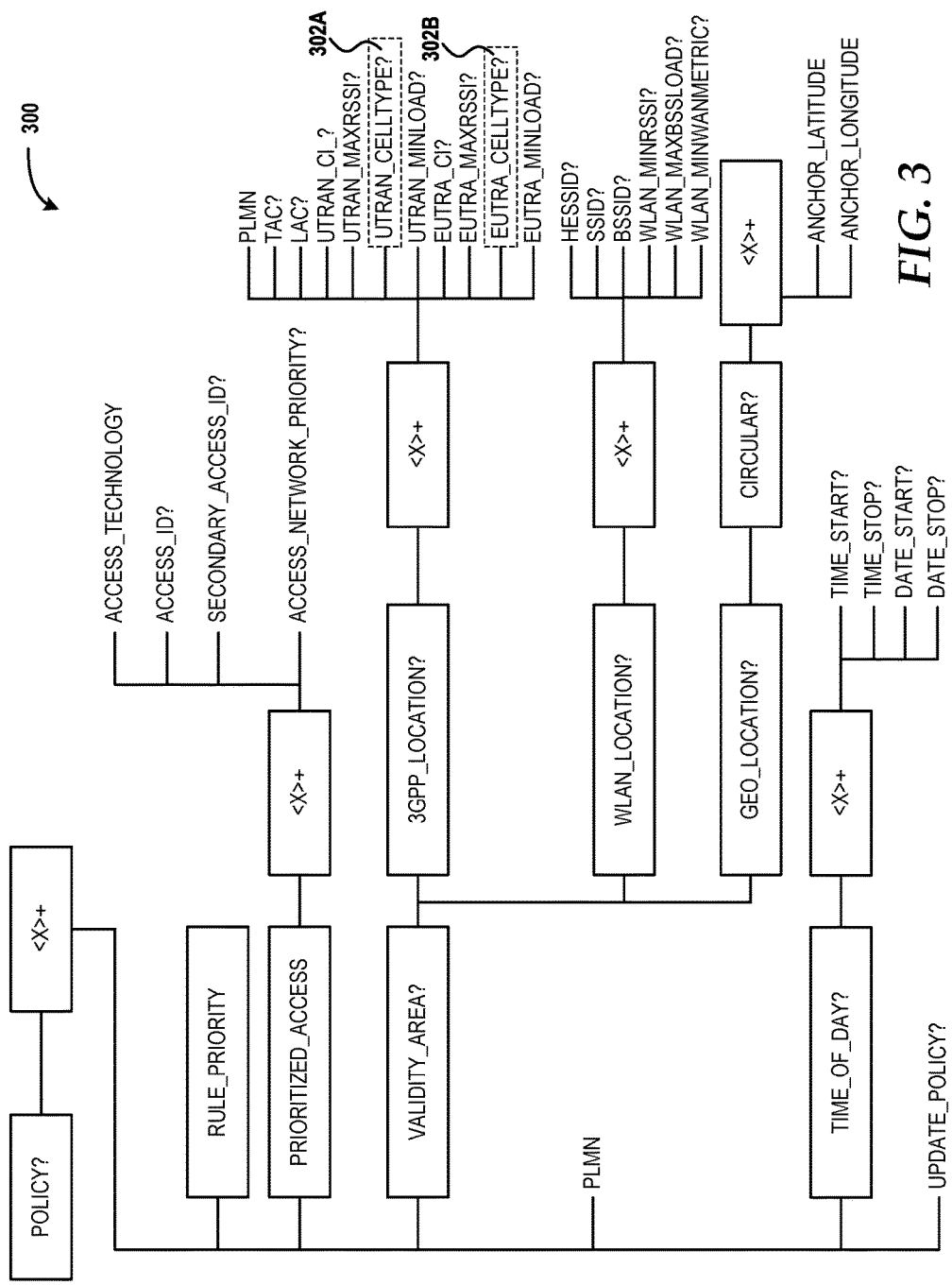
FIG. 3 is a diagram illustrating aspects of an access network discovery and selection function ("ANDSF") management object tree, according to an illustrative embodiment.

Turning now to FIG. 3, a diagram illustrating aspects of an ANDSF MO tree 300 will be described, according to an illustrative embodiment. The illustrated ANDSF MO tree 300 defines MOs that can be used by an ANDSF, such as the RAT selection system 112, and a mobile device, such as the mobile device 102, to enable a more flexible policy-based dynamic network selection platform that allows user IP traffic to be routed to the best radio technology available to the mobile device based upon the camping/serving cell coverage characteristics. The ANDSF MO tree 300 also helps ensure a robust policy-based network selection in a true heterogeneous network environment, within which various networks exist (e.g., macro cells, small cells, WLAN cells, and white space cells) that require different policies based upon distinct coverage characteristics.

The ANDSF MO tree 300 includes MOs that are compatible with Open Mobile Alliance ("OMA") Device Management ("DM") protocol specifications. The ANDSF MO tree 300 additionally includes two cell-type MOs 302A, 302B. The cell-type MOs 302A, 302B allow an operator to specify cell-type specific network selection policies that can be utilized by a mobile device, such as the mobile device 102, in network selection based upon the cell-type of the camping/serving cell in which the mobile device is currently located. The MOs other than the cell-type MOs 302A, 302B are not described in greater detail herein, since these MOs are known to those skilled in the art and are publicly available in the relevant 3GPP specifications.

The first cell-type MO 302A is used to identify the cell-type of a UTRAN cell. The second cell-type MO 302B is used to identify the cell-type of an E-UTRAN cell. It is contemplated, however, that additional or alternative cell-type MOs may be added to the ANDSF MO tree 300 to encompass other RAN types, such as the RAN types described herein above.

Figure 4:
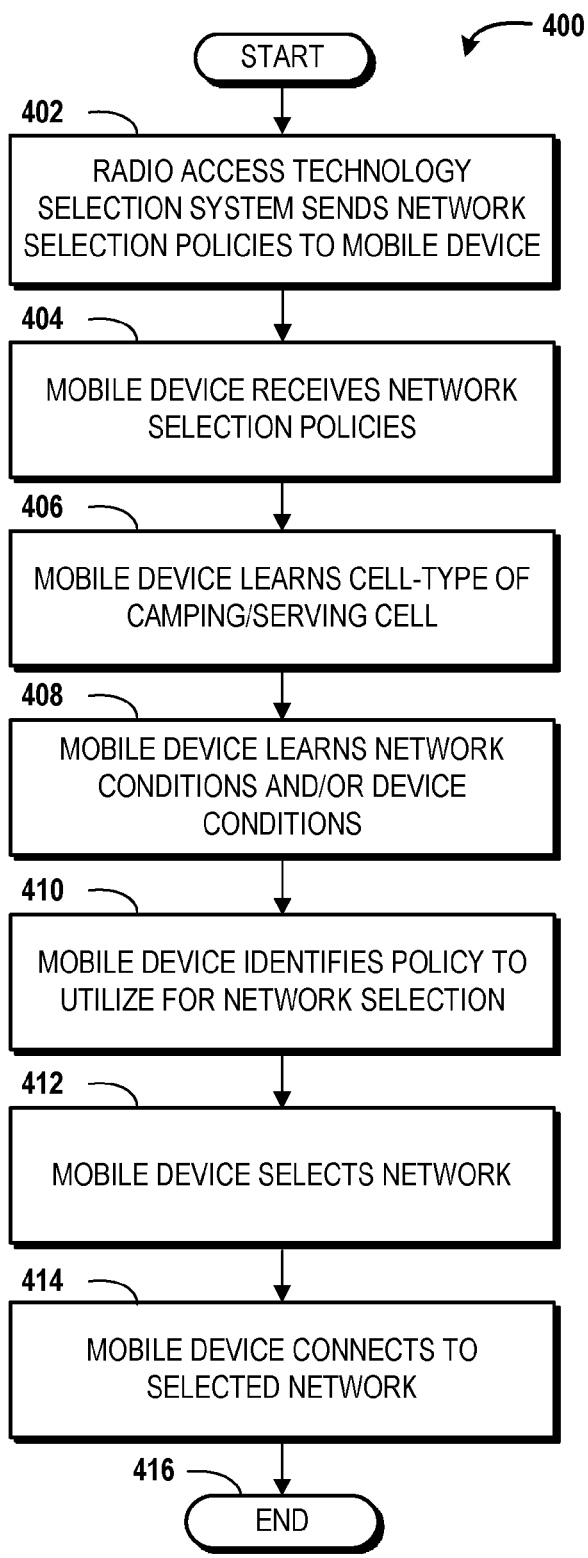
FIG. 4 is a flow diagram illustrating aspects of a method for selecting a radio access network ("RAN") based, at least in part, upon a cell-type, according to an illustrative embodiment.

Turning now to FIG. 4, a flow diagram illustrating aspects of a method 400 for selecting a radio access network ("RAN") based, at least in part, upon a cell-type will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the mobile device 102, the RAN(s) 104, the RAT selection system 112, the policy server 110, the user profile server 116, and/or one or more other computing systems and/or devices disclosed herein to perform operations.

For purposes of illustrating and describing some of the concepts of the present disclosure, the method 400 is disclosed herein are described as being performed, in part, by the RAT selection system 112 and, in part, by the mobile device 102, via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 begins and proceeds to operation 402, where an ANDSF, such as the RAT selection system 112, sends network selection policies, such as the policies 108, to one or more mobile devices, such as the mobile device 102. In the method 400, each of the network selection policies includes a cell-type specification, which may be embodied as a MO in an ANDSF MO tree, such as the ANDSF MO tree 300, illustrated and described herein with reference to FIG. 3.

From operation 402, the method 400 proceeds to operation 404, where the mobile device 102 receives the policies 108 from the RAT selection system 112. The method 400 then proceeds to operation 406, where the mobile device 102 learns the cell-type of the camping cell or serving cell depending upon the mode of operation of the mobile device 102. The mobile device 102 can learn the cell-type of the camping cell or the serving cell from cell information received from an associated RAN, such as, for example, the cell information A 106A received from the RAN A 104A, the cell information B 106B received from the RAN B 104B, or the cell information N 106N received from the RAN N 104N.

Cell-types can include, but are not limited to, a macro cell-type, a metro cell-type, a femto cell-type, a pico cell-type, a micro cell-type, WLAN cell-type, a MSMC cell-type, and a white space network cell-type. Other cell-types, including proprietary cell-types, temporary cell-types, and ad-hoc cell-types are also contemplated.

Cell information 106 can identify a cell as being of a particular cell type. The cell information 106 can include an explicit specification of a cell-type of one or more cells. For example, the cell information 106 may include text that explicitly names the cell-type for a given cell. As another example, the cell information 106 may include a code or identifier by which the mobile device 102 can ascertain the cell-type of one or more cells. In this example, the mobile device 102 may have a table or other data structure by which to cross-reference cell-type codes or identifiers with cell-types.

The cell information 106 may be sent to the mobile device 102 in one or more messages, which can be any message type that is capable of being sent to the mobile device 102 from a base station over a radio/air interface. A message that includes at least a portion of the cell information 106 can be sent to the mobile device 102 using any physical, transport, and/or logical channels. These channel types are generally known and therefore not described in greater detail herein.

In some embodiments, the cell information 106 is included in a SIB. In some other embodiments, the cell information 106 is included in a SIB that contains other information. The SIB may be a new SIB configured to include cell-type information associated with one or more cells. Alternatively, the SIB may be an existing SIB that has been modified to include cell-type information associated with one or more cells.

In some embodiments, the cell information 106 is included in an SMS message. In some other embodiments, the cell information 106 is included in an SMS-CB message. In some other embodiments, the cell information 106 is included in a SMPP message. The cell information 106 may be sent to the mobile device 102 via other messaging services, including, but not limited to, MMS, WAP push message, USSD, or any combination thereof.

Cell-type information can be conveyed to the mobile device 102 using existing information, such as, but not limited to, LAI, CID, RAI, TAI, PCI, or some combination thereof. In these embodiments, the mobile device 102 can use one or more of these identities to 1 the cell-type of one or more cells, for example, utilizing a table or other data structure stored on or otherwise accessible by the mobile device 102.

A cell-type can be associated with a particular identity or range of identities of one or more of the above identities. For example, an ID range of 100-49,999 may be assigned to macro cells, an ID range of 50,000-200,000 may be assigned to metro cells, and so on. The mobile device 102 can utilize an LAI, CID, RAI, TAI, or some combination thereof to determine a cell-type for the cell(s) associated with one or more of these IDs.

In some embodiments, the mobile device 102 learns the cell information 106 from a base station that itself learned the cell-type information from one or more neighboring base stations via a self-organizing network or self-optimizing network feature such as provided by 3GPP and/or NGMN. In particular, a base station can utilize the ANR detection feature of LTE to detect one or more neighboring eNode-Bs and collect a portion of the cell information 106 therefrom. Other mechanisms by which a base station can learn load information from one or more neighboring cells are contemplated.

From operation 406, the method 400 proceeds to operation 408, where the mobile device 102 learns network conditions and/or device conditions. The network conditions can include network load information as described above. The device conditions can include conditions derived from the local device information 208 described above with reference to FIG. 2.

From operation 408, the method 400 proceeds to operation 410, where the mobile device 102 identifies a policy, such as the policy 108, to utilize for network selection based, at least in part, upon the cell-type learned at operation 406. From operation 410, the method 400 proceeds to operation 412, where the mobile device 102 selects one or more of the RANs 104 using the policy 108 identified at operation 410. The method 400 then proceeds to operation 414, where the mobile device 102 connects to the selected RAN(s).

From operation 414, the method 400 proceeds to operation 416. The method 400 ends at operation 416.

Figure 5A:
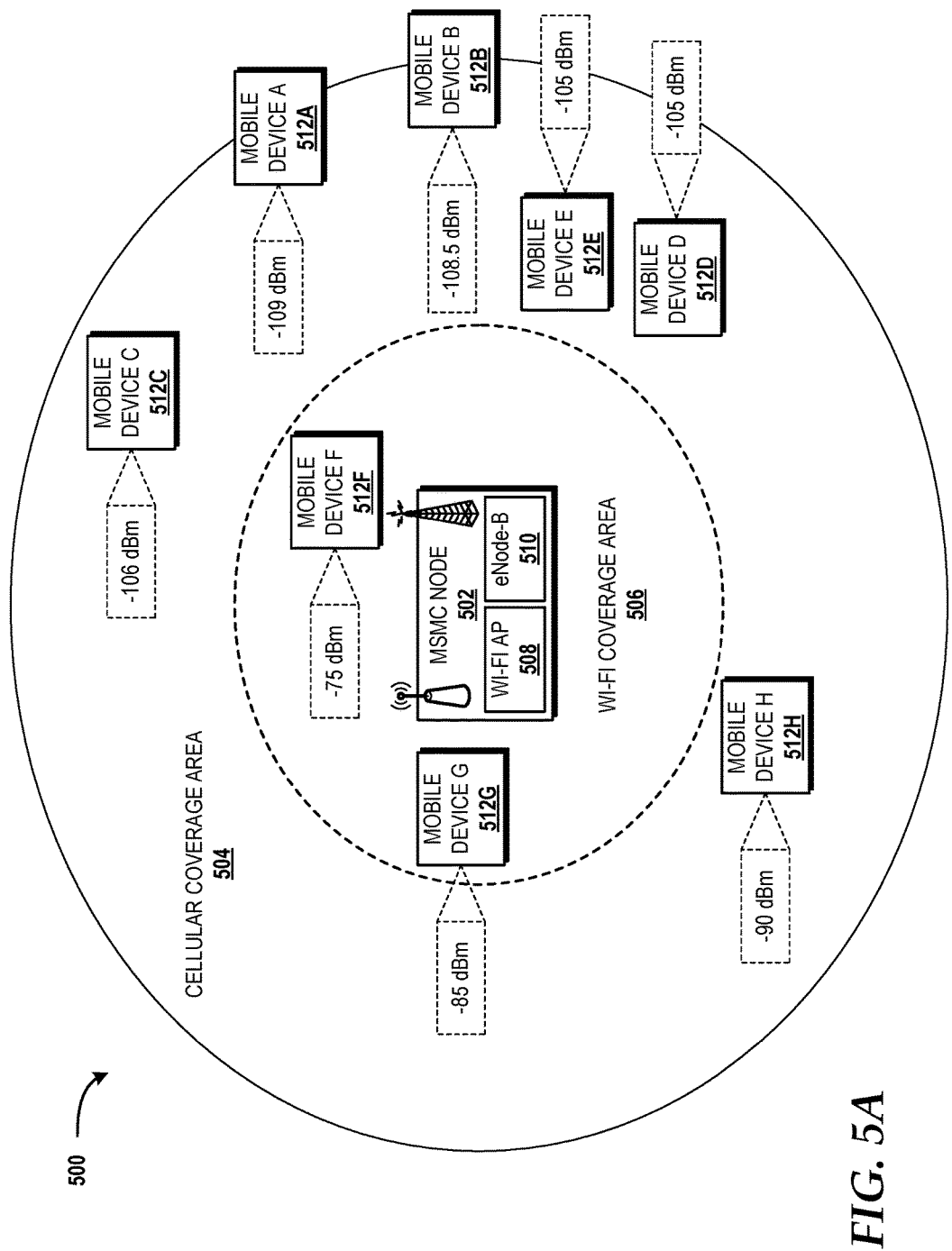
FIGS. 5A-5B are block diagrams illustrating example scenarios in which a mobile device can select different RANs based, at least in part, upon cell-type, according to an illustrative embodiment.
Figure 5B:
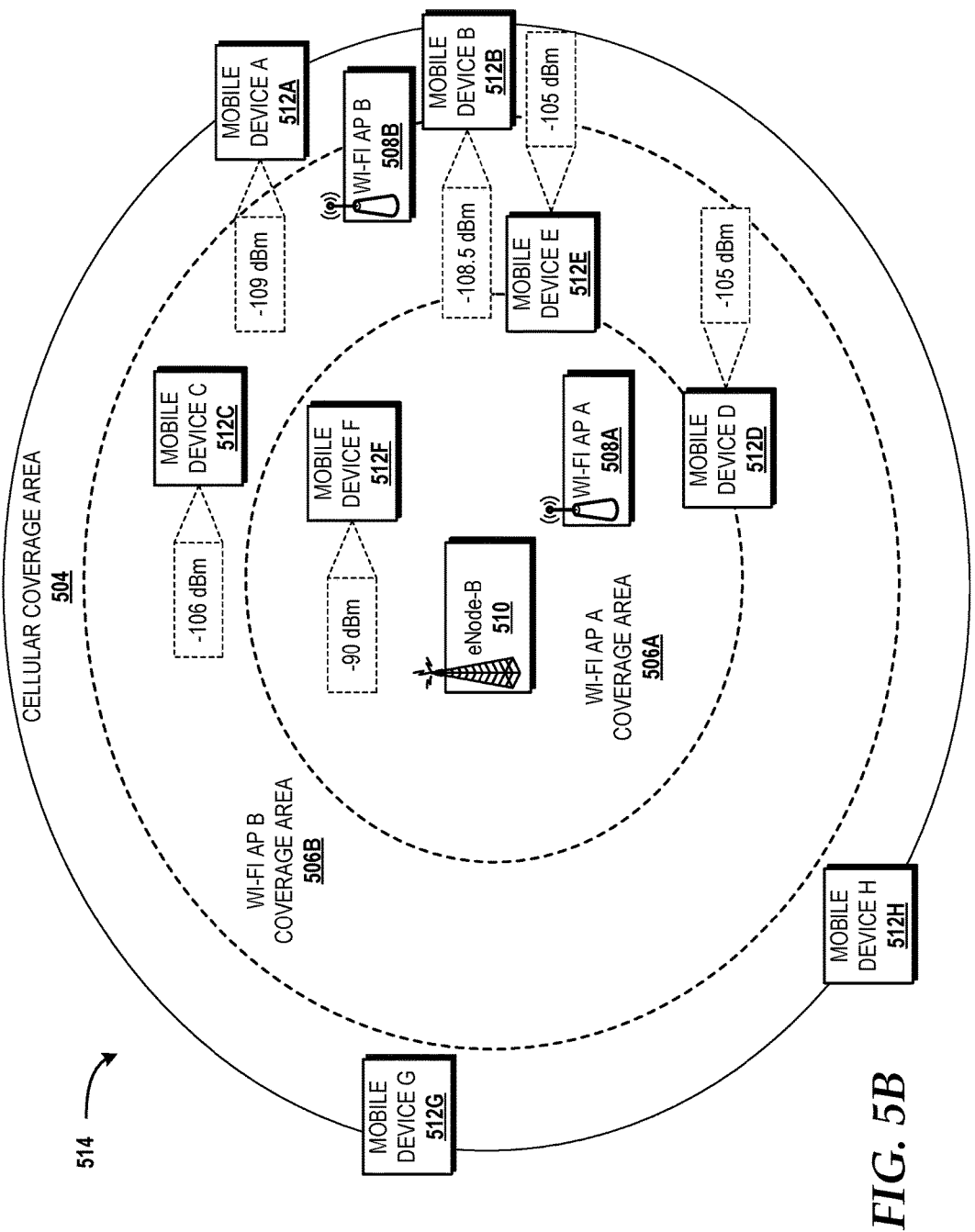

Turning now to FIGS. 5A-5B, block diagrams illustrating example scenarios in which a mobile device can select different RANs based, at least in part, upon cell-type will be described, according to an illustrative embodiment. Referring first to FIG. 5A, an MSMC environment 500 is shown. The illustrated MSMC environment 500 includes an MSMC node 502 that provides a cellular coverage area 504 and a WI-FI coverage area 506 via co-located cellular and WI-FI components—namely, a WI-FI AP 508 and an eNode-B 510. Although the MSMC node 502 is shown as having components to provide WI-FI and LTE service, the MSMC node 502 may alternatively provide WI-FI and another cellular service, such as, but not limited to, GSM or UMTS. As such, the illustrated example should not be construed as being limiting.

The MSMC environment 500 also includes a plurality of mobile devices 512A-512H (referred to collectively or generally as "mobile devices 512") operating at different power levels, represented in units of dBm. Although only eight mobile devices are shown, the MSMC environment 500 may support more or fewer mobile devices. In the illustrated example, a policy is defined directing that network conditions indicate that the cellular coverage area 504 is not congested (e.g., based upon a pre-defined network congestion threshold), traffic flow between the mobile devices 512 and the MSMC node 502 is conducted using the eNode-B 510. The policy is also defined directing that when network conditions indicate that the cellular coverage area 504 is congested, traffic flow between a portion of the mobile device 512 and the MSMC node 502 can be offloaded from the eNode-B 510 of the MSMC node 502 to the WI-FI AP 508. In the illustrated example, traffic flow to/from the mobile device F 512F and the mobile device G 512G is offloaded from the eNode-B 510 to the WI-FI AP 508 since the mobile device F 512F and the mobile device G 512G are currently located within the WI-FI coverage area 506. By offloading traffic flow to/from the mobile device F 512F and the mobile device G 512G is offloaded from the eNode-B 510 to the WI-FI AP 508, the MSMC node 502 can better accommodate the other mobile devices operating further away from the MSMC node 502 but remaining in the cellular coverage area 504.

Referring now to FIG. 5B, a macro cell environment 514 is shown. The illustrated macro cell environment 514 includes a stand-alone eNode-B 510 and two stand-alone WI-FI APs 508A, 508B. The stand-alone eNode-B 510 provides the cellular coverage area 504. The WI-FI AP A 508A provides a WI-FI AP A coverage area 506A. The WI-FI AP B 508B provides a WI-FI AP B coverage area 506B. Both the WI-FI AP A coverage area 506A and the WI-FI AP B coverage area 506B are encompassed within the cellular coverage area 504. Although the e-Node-B 510 is shown, the e-Node-B 510 may be replaced with another type of base station to provide a cellular service other than LTE. As such, the illustrated example should not be construed as being limiting.

The macro cell environment 514 also includes the plurality of mobile devices 512A-512H operating at different power levels, represented in units of dBm. Although only eight mobile devices are shown, the macro cell environment 514 may support more or fewer mobile devices. In the illustrated example, a policy is defined directing that when network conditions indicate that the cellular coverage area 504 is not congested (e.g., based upon a pre-defined network congestion threshold), traffic flow is conducted using the eNode-B 510. The policy is also defined directing that when network conditions indicate that the cellular coverage area 504 is congested, traffic flow between a portion of the mobile devices 512 and the eNode-B 510 can be offloaded from the eNode-B 510 to the WI-FI AP A 508A or the WI-FI AP B 508B if the mobile devices 512 are within the WI-FI AP A coverage area 506A or the WI-FI AP B coverage area 506B. In the illustrated example, traffic flow to/from the mobile device A 512A and the mobile device B 512B is offloaded from the eNode-B 510 to the WI-FI AP B 508B, and traffic flow to/from the mobile device E 512E and mobile device D 512D is offloaded from the eNode-B 510 to the WI-FI AP A 508A. In some policy implementations, traffic can be offloaded from the cellular coverage area 504 to one of the WI-FI coverage areas 506A, 506B in a tiered manner such that as the cellular coverage area 504 becomes more congested, more traffic is offloaded to the WI-FI coverage areas 506A, 506B.

Figure 6:
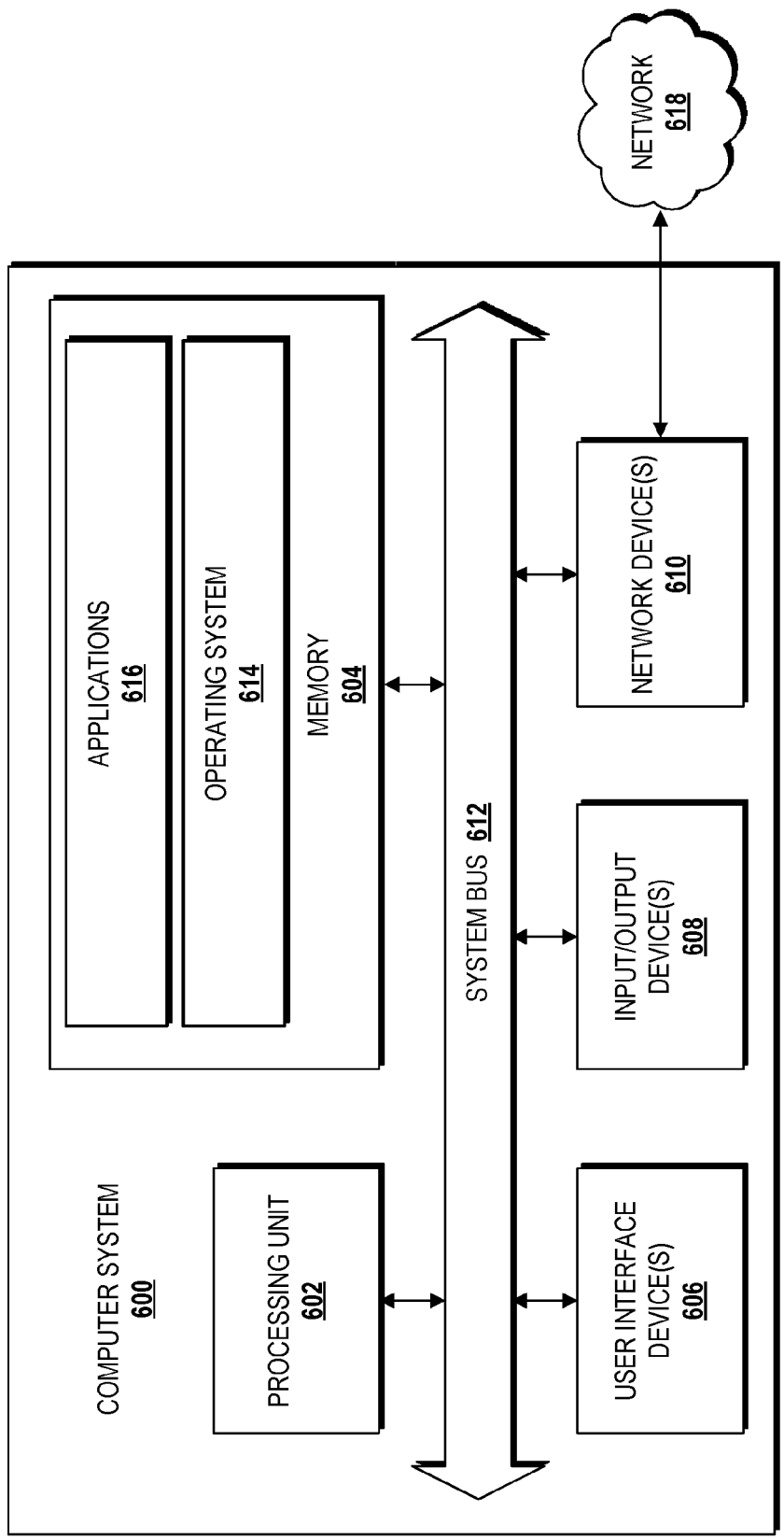
FIG. 6 is a block diagram illustrating an example computer system capable of implementing aspects of the embodiments presented herein.

FIG. 6 is a block diagram illustrating a computer system 600 configured to perform various operations disclosed herein. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the mobile device 102, one or more components of the RANs 104, the RAT selection system 112, the policy server 110, and/or the user profile server 116 is/are configured, at least in part, like the computer system 600. It should be understood, however, that the mobile device 102, one or more components of the RANs 104, the RAT selection system 112, the policy server 110, and/or the user profile server 116 may include additional functionality or include less functionality than now described.

The processing unit 602 may be a standard central processor that performs arithmetic and logical operations, a more specific purpose programmable logic controller ("PLC"), a programmable gate array, or other type of processor known to those skilled in the art and suitable for controlling the operation of the computer system 600. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more applications 616.

The operating system 614 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 606 may include one or more devices with which a user accesses the computer system 600. The user interface devices 606 may include, but are not limited to, computers, servers, personal digital assistants, telephones (e.g., cellular, IP, or landline), or any suitable computing devices. The I/O devices 608 enable a user to interface with the program modules. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network 618. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a WLAN such as a WI-FI network, a WWAN, a wireless PAN ("WPAN") such as BLUETOOTH, or a wireless MAN ("WMAN"). Alternatively, the network 618 may be a wired network such as, but not limited to, a WAN such as the Internet, a LAN such as the Ethernet, a wired PAN, or a wired MAN.

The network 618 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 618. Therefore, the embodiments presented herein should not be construed as being limiting to a particular mobile telecommunications technology and/or standards utilizing such technologies.

Figure 7:
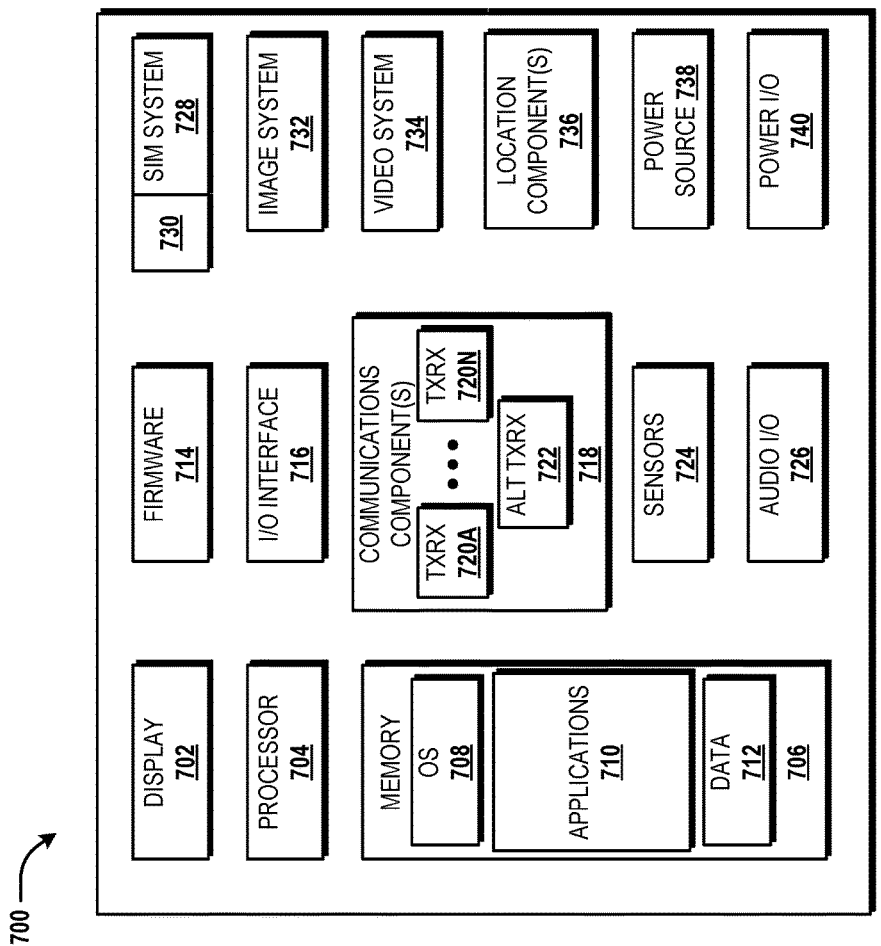
FIG. 7 is a block diagram illustrating an example mobile device capable of implementing aspects of the embodiments disclosed herein.

Turning now to FIG. 7, an illustrative mobile device 700 and components thereof will be described. In some embodiments, the mobile device 102 and/or one or more of the mobile devices 512 described above with reference to FIGS. 1, 2, 5A, and 5B can be configured as and/or can have an architecture similar or identical to the mobile device 700 described herein in FIG. 7. It should be understood, however, that the mobile device 102 and/or one or more of the mobile devices 512 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, which may include the network decision engine 202, the network connection manager 204, one or more applications associated with the application information 214, other computer-executable instructions stored in the memory 706, or the like. In some embodiments, the applications 710 also can include a UI application (not illustrated in FIG. 7).

The UI application can interface with the operating system 708, such as the operating system 200 shown in FIG. 2, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in answering/initiating calls, data communications, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the cell information 106, the policies 108, the user profiles 114, the local device information 208, and/or other data.

According to various embodiments, the applications 710 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the RANs 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 700 or other devices or computers described herein, such as the computer system 700 described above with reference to FIG. 7. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 700 in order to store and execute the software components presented herein. It is also contemplated that the mobile device 700 may not include all of the components shown in FIG. 7, may include other components that are not explicitly shown in FIG. 7, or may utilize an architecture completely different than that shown in FIG. 7.

Figure 8:
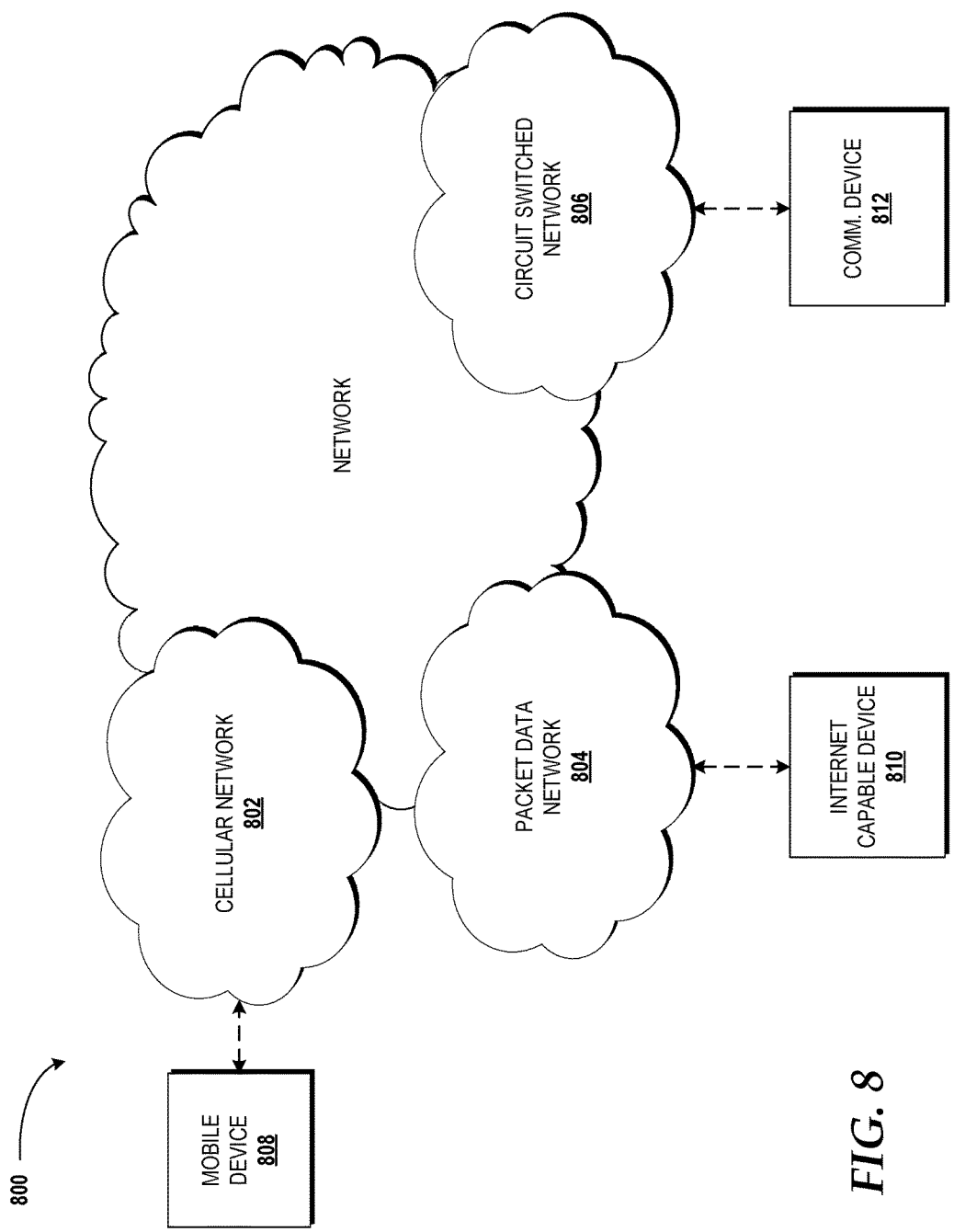
FIG. 8 is a diagram illustrating a network, according to an illustrative embodiment.

Turning now to FIG. 8, details of a network 800 are illustrated, according to an illustrative embodiment. The network 800 includes a cellular network 802, a packet data network 804, for example, a WI-FI network and/or the Internet, and a circuit switched network 806, for example, a PSTN.

The cellular network 802 includes various components such as, but not limited to, BTSs, Node-B's or e-Node-B's, base station controllers ("BSCs"), radio network controllers ("RNCs"), mobile switching centers ("MSCs"), mobile management entities ("MMEs"), SMSCs, multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IMS, and the like. The cellular network 802 also includes radios and nodes for receiving and transmitting voice, data, and combinations thereof to and from radio transceivers, networks, the packet data network 804, and the circuit switched network 806. The network 800 can also include the RAT selection system 112, the policy server 110, the user profile server 116, and/or one or more of the RANs 104 illustrated and described above with reference to FIG. 1.

A mobile communications device 808, such as, for example, a cellular telephone, a user equipment, a mobile terminal, a PDA, a laptop computer, a handheld computer, the mobile device 102, the mobile devices 512 and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with one another, as is generally known. In some embodiments, the packet data network 804 is or includes one or more WI-FI networks, each of which can include one or more WI-FI access points, routers, switches, and other WI-FI network components. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a POTS. The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, the mobile device 102, the mobile devices 512, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810.

Based on the foregoing, it should be appreciated that concepts and technologies for an enhancement to an ANDSF to include cell-type in an ANDSF MO tree have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A computer storage medium that stores instructions that, when executed by a processor, cause the processor to perform operations comprising:
generating a policy for network selection, the policy comprising network selection criteria based upon a cell-type defined in a management object of an access network discovery and selection function tree of an access network discovery and selection function; and
sending the policy to a mobile device, wherein the mobile device utilizes the policy to select a network.

2. The computer storage medium of claim 1, wherein the cell-type comprises a small cell cell-type.

3. The computer storage medium of claim 1, wherein the cell-type comprises a macro cell cell-type.

4. The computer storage medium of claim 1, wherein the cell-type comprises a multi-standard metro cell cell-type.

5. The computer storage medium of claim 1, wherein the network selection criteria is further based upon WI-FI availability.

6. The computer storage medium of claim 1, wherein the network selection criteria comprises criteria based upon network load information.

7. The computer storage medium of claim 1, wherein the network selection criteria further comprises criteria based upon local device information.

8. The computer storage medium of claim 1, wherein the network selection criteria further comprises criteria based upon a user profile of a user associated with the mobile device.

9. A computer storage medium that stores instructions that, when executed by a processor of a mobile device, cause the processor to perform operations comprising:
receiving a plurality of policies from an access network discovery and selection function of a radio access technology selection system;
identifying a policy of the plurality of policies to utilize for network selection, the policy comprising network selection criteria based upon a cell-type defined in a management object of an access network discovery and selection function tree of the access network discovery and selection function;
selecting a network based upon the policy; and
connecting to the network.

10. The computer storage medium of claim 9, wherein the plurality of policies further comprise a further policy to utilize for network selection, the further policy comprising further network selection criteria based upon a further cell-type, and wherein identifying the policy to utilize for network selection comprises identifying the policy instead of the further policy based upon cell-type information associated with a cell in which the mobile device is currently located matching the cell-type comprised within the network selection criteria of the policy.

11. The computer storage medium of claim 10, wherein the operations further comprise learning the cell-type information associated with the cell in which the mobile device is currently located.

12. The computer storage medium of claim 11, wherein identifying the policy instead of the further policy is further based upon network load information.

13. The computer storage medium of claim 11, wherein identifying the policy instead of the further policy is further based upon local device information.

14. The computer storage medium of claim 9, wherein the network selection criteria is further based upon WI-FI availability.

15. A method comprising:
receiving, by a mobile device, a plurality of policies from an access network discovery and selection function of a radio access technology selection system;
identifying, by the mobile device, a policy of the plurality of policies to utilize for network selection, the policy comprising network selection criteria based upon a cell-type defined in a management object of an access network discovery and selection function tree of the access network discovery and selection function;
selecting, by the mobile device, a network based upon the policy; and
connecting, by the mobile device, to the network.

16. The method of claim 15, wherein the plurality of policies further comprise a further policy to utilize for network selection, the further policy comprising further network selection criteria based upon a further cell-type, and wherein identifying the policy to utilize for network selection comprises identifying the policy instead of the further policy based upon cell-type information associated with a cell in which the mobile device is currently located matching the cell-type comprised within the network selection criteria of the policy.

17. The method of claim 16, further comprising learning the cell-type information associated with the cell in which the mobile device is currently located.

18. The method of claim 17, wherein identifying the policy instead of the further policy is further based upon network load information.

19. The method of claim 17, wherein identifying the policy instead of the further policy is further based upon local device information.

20. The method of claim 17, wherein identifying the policy instead of the further policy is further based upon WI-FI availability.

* * * * *